W. F. SWOVELAND.
PROTECTIVE SAFETY DEVICE FOR ELECTRICAL CIRCUITS.
APPLICATION FILED OCT. 16, 1908.

978,676.

Patented Dec. 13, 1910.

3 SHEETS—SHEET 1.

Witnesses
Jos Gregory.
L. L. Durket.

Inventor
WILLIAM F. SWOVELAND,
By Wm Bagger & Co.
Attorneys

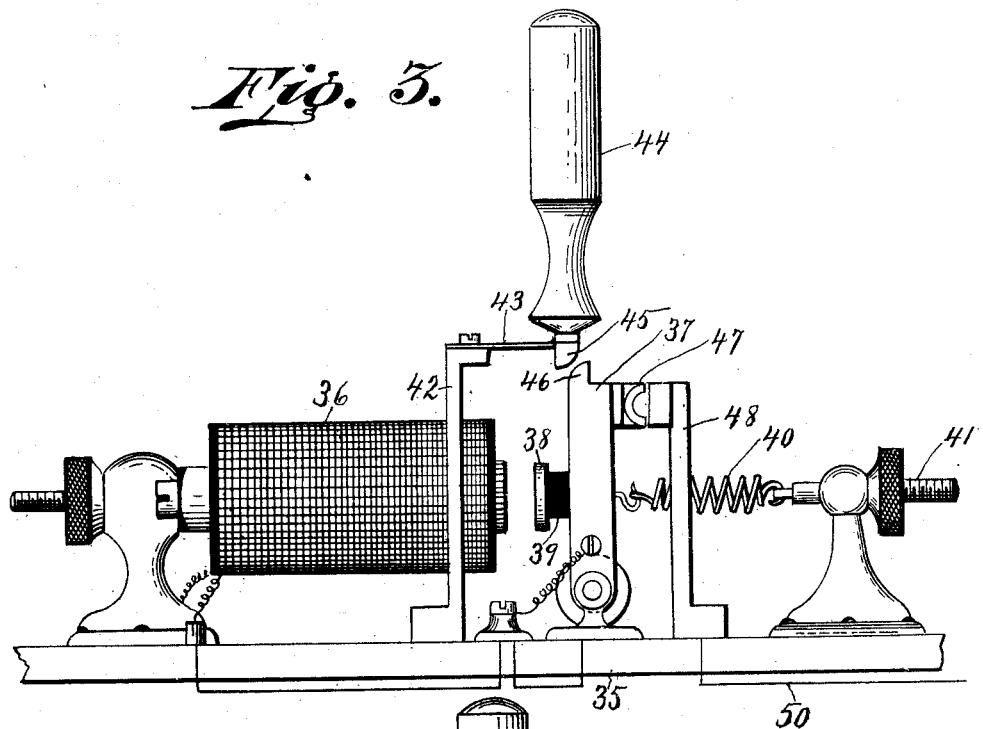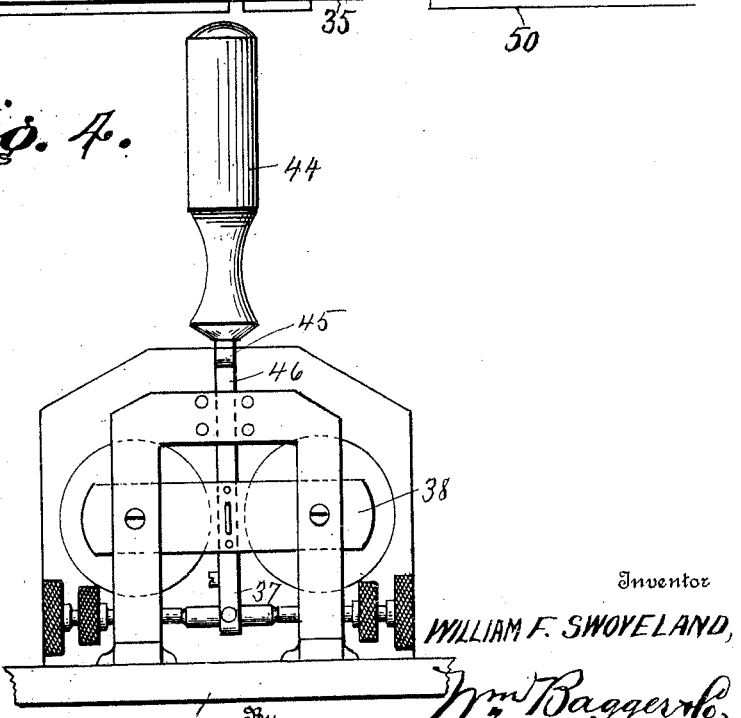

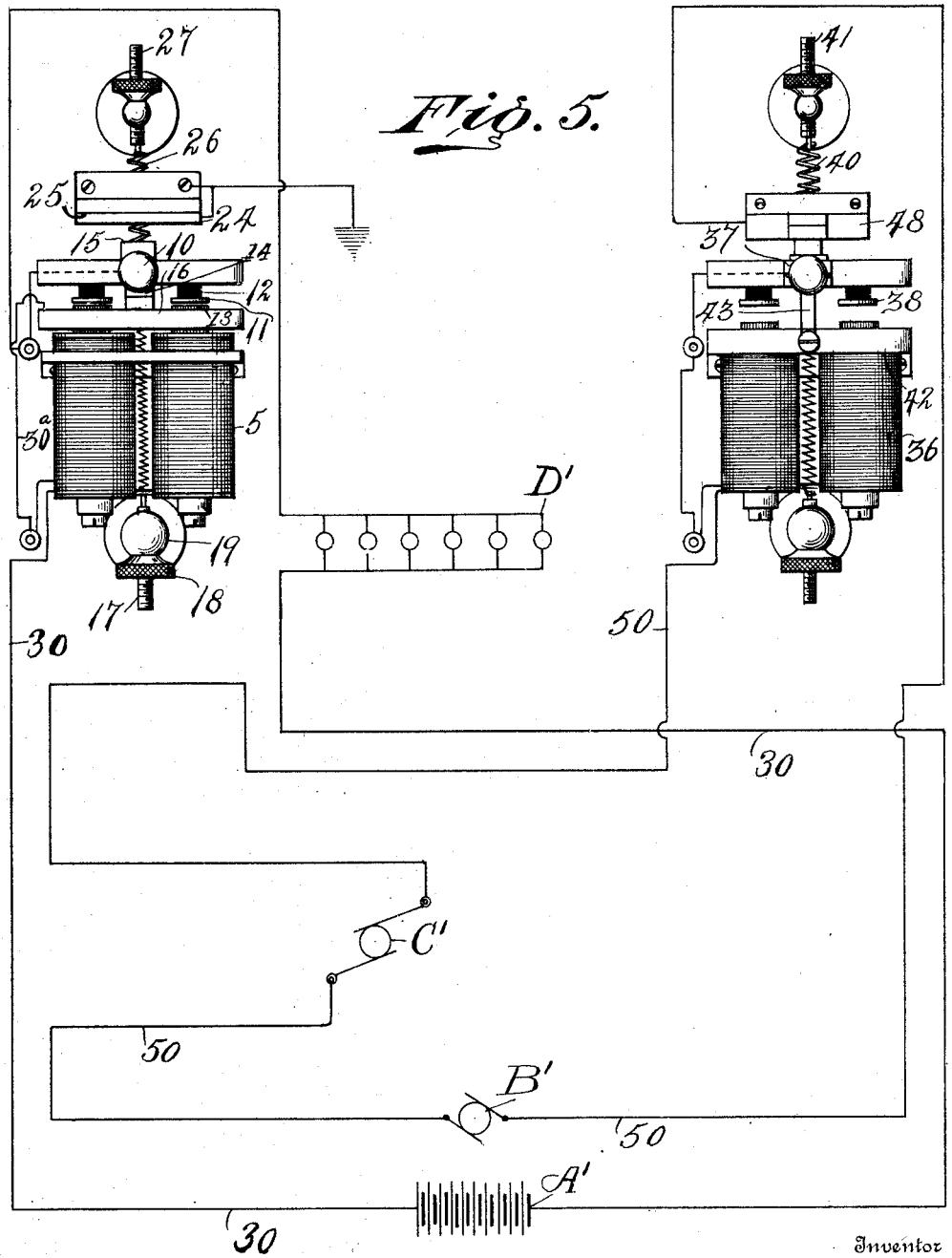

UNITED STATES PATENT OFFICE.

WILLIAM F. SWOVELAND, OF ALTOONA, PENNSYLVANIA.

PROTECTIVE SAFETY DEVICE FOR ELECTRICAL CIRCUITS.

978,676.   Specification of Letters Patent.   Patented Dec. 13, 1910.

Application filed October 16, 1908.   Serial No. 458,033.

*To all whom it may concern:*

Be it known that I, WILLIAM F. SWOVELAND, a citizen of the United States, residing at Altoona, in the county of Blair and State of Pennsylvania, have invented certain new and useful Improvements in Protective Safety Devices for Electrical Circuits, of which the following is a specification.

This invention relates to safety devices for wiring circuits and has special reference to devices for protecting low tension circuits. It is a well known fact that in many cities there is a net work of high and low tension circuits, the former usually consisting of power and lighting circuits and being relatively near the ground, while the latter include telephone, telegraph and messenger call systems and cross above the high tension circuits so that when one of the comparatively light low tension wires breaks and falls across a high tension wire such as a trolley wire great damage and danger ensue.

One object of the invention is to protect low tension systems such as embrace telephone and telegraph instruments from damage through the line wires breaking and falling on high tension systems such as electric car and lighting systems.

Another object of the invention is to provide a novel means whereby the breaking of a low tension wire will ground the circuit so that if the wire contacts with a high tension wire the latter will also be grounded thus minimizing the danger resulting to linemen and others through such breakage.

A third object of the invention is to provide means whereby a high tension circuit may be instantly broken when a low tension line wire breaks and contacts therewith.

With these and other ends in view which will readily appear as the nature of the invention is better understood, the same consists in the improved construction and novel arrangement and combination of parts, which will be hereinafter fully described and particularly pointed out in the claims.

In the accompanying drawings has been illustrated a simple and preferred form of the invention; it being, however understood that no limitation is necessarily made to the precise structural details therein exhibited, but that changes, alterations and modifications within the scope of the invention may be resorted to when desired.

Figure 1:
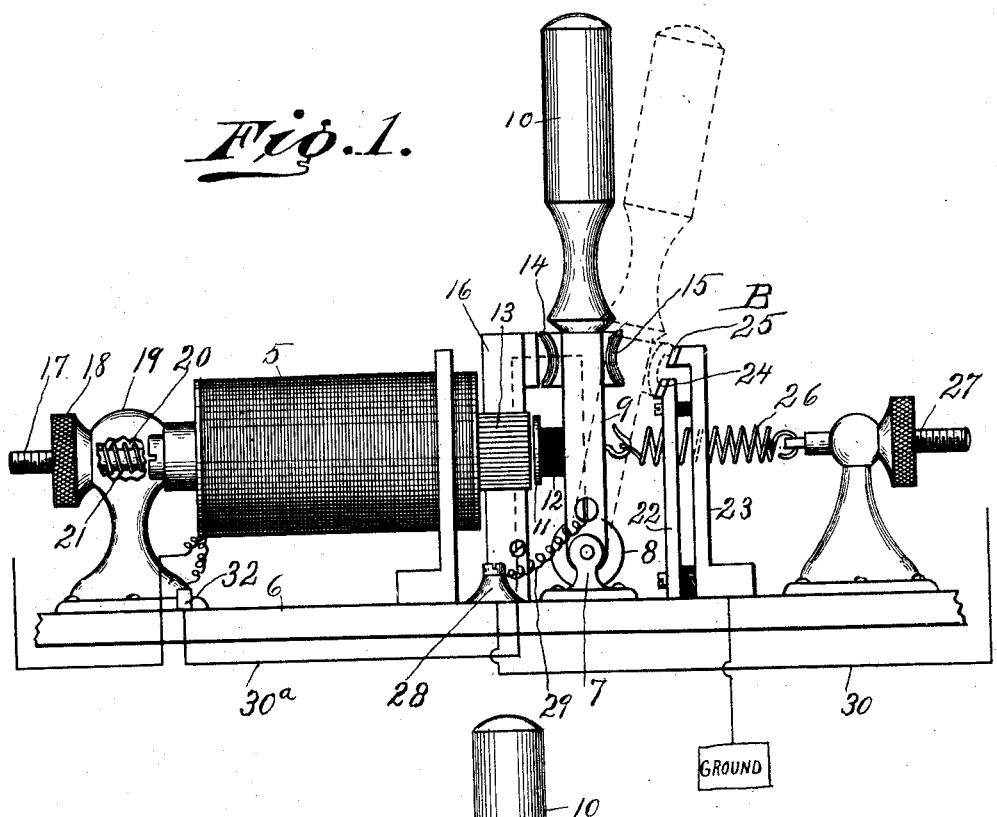
Figure 2:
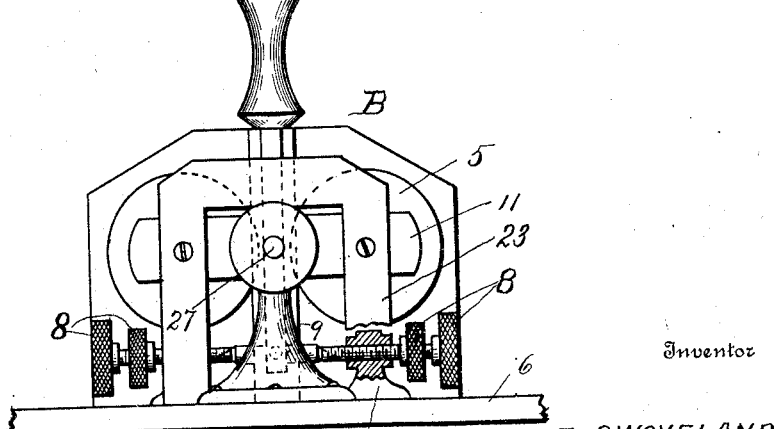

In the drawings—Figure 1 is a side elevation, partly in section, of an automatic line cut-out and line grounding instruments which constitutes a part of the invention. Fig. 2 is an end elevation of the same. Fig. 3 is a side elevation of an automatic circuit breaker used in connection with and forming a part of the invention. Fig. 4 is an end elevation of the same. Fig. 5 is a diagrammatic view illustrating the installation of the instruments and the electrical circuits in which they are contained.

Corresponding parts in the several figures are denoted by like characters of reference.

The line cut-out and grounding instrument B used in the low tension circuits comprises an electro-magnet 5, which is supported upon a base 6. Said base is provided with ears or brackets 7, carrying adjusting screws 8, of conventional construction which serve to support a frame 9, having a handle 10, said frame being hingedly supported for oscillatory or rocking movement, and the supporting screws 8 being capable of adjustment so as to regulate the amount of friction, and thus enable the frame to swing or rock more or less freely as may be desired. The frame 9, which is supported adjacent to the front end of the electro-magnet carries an armature 11, which is separated from the frame by insulation 12 and which is normally attracted by the core 13 of the electro-magnet. For the purpose of securing increased efficiency it is preferred to use a laminated core, but this is not essential.

Upon the opposite sides or faces of the frame 9 are mounted contact brushes 14 and 15, the former of which normally contacts with a post 16 rising from the base between the cores of the electro-magnet. Said cores are longitudinally slidable or movable, and are suitably connected with screw-threaded stems 17 having nuts 18, bearing against uprights 19, which are supported upon the base and afford supports or bearings for the stems carrying the cores of the electro-magnet. The uprights 19 are provided with recesses 20 forming housings for the springs 21 that are coiled upon the stems 17, serving to force said stems and the cores carried thereby in a forward direction to maintain said cores normally in engagement with the contact member 11. By this arrangement it will be readily seen that wear upon the brush 14 may be compensated for, and a nice and accurate adjustment of the parts may always be easily obtained.

Supported upon the base 6, adjacent to the front side of the hingedly supported frame 9, are grounding posts 22 and 23, which have been shown as consisting of enlarged U-shaped frames of unequal height and provided with beveled or inclined contact faces 24 and 25 adapted to be simultaneously engaged by the contact brush 15 when the frame 9 is rocked in a forward direction under the impulse of a spring 26, having an adjusting screw 27, whereby the tension of said spring may be adjusted in the usual manner. These two posts are provided in order that the cross sectional area may be sufficient to conduct the current while, at the same time, the two posts are more resilient than a single one of equal area and width.

28 designates a binding post of conventional construction which is mounted upon the base 6, adjacent to the contact post 16, said contact 28 being connected with the frame 9, by a wire coil 29. The line wire 30 is connected with the binding post 28, and through the coil 29 and the frame 9, which constitutes a conductor, the electrical energy passes through the contacts 14 and 16 and from the latter through a wire 30ª, to a contact 32 which in turn is connected with one end of the winding of the electro-magnet which is included in the circuit in the usual manner.

When the circuit is interrupted, as through the breakage of a wire, the core of the electro-magnet becomes demagnetized and the frame 9, under the impulse of the spring 26, swings or rocks in a forward direction, placing the brush 15 in contact with the faces of the grounding posts 22, 23, thus grounding the circuit and preparing it to meet the next high tension live wire which may be encountered; and thereby raising the amperage of the circuit of such live wire and throwing into operation the automatic interlocking circuit breaker which constitutes a part of the device and which will now be described.

Supported upon a suitable base 35 is an electro-magnet 36, having a longitudinally slidable and adjustable spring actuated core which is constructed and mounted for operation precisely like the core of the electro-magnet of the line grounding instrument previously described. A frame 37, hingedly supported for rocking or oscillatory movement adjacent to the front end of the electro-magnet carries an armature 38 which is separated from said frame by insulation 39. A spring 40, the tension of which may be adjusted by a screw 41 serves normally to hold the oscillatory frame 37 from movement toward the magnet 36. A bracket 42, which is mounted upon the base near the front end of the electro-magnet supports a flat leaf-spring 43 having a handle 44 and a terminal downwardly projecting beveled hook or tooth 45, which is adapted to engage a correspondingly beveled hook or tooth 46, at the upper extremity of the frame 37. Said frame carries upon its front side or face, which is distant from the electro-magnet, a contact brush 47 normally engaging a contact post 48, being held in such engagement by the action of the spring 40. The post 40 is electrically connected with the line-wire 50.

Under normal conditions the tension of the spring 40 exceeds the attraction of the electro-magnet 36. In the event of the interruption of the circuit carrying the automatic line cut-out, the amperage of the circuit carrying the circuit breaker becomes greatly increased, and the attraction of the electro-magnet 36 will overcome the tension of the spring 40, thus swinging or rocking the frame 37 in a rearward direction until the tooth 46 becomes engaged by the spring supported tooth 45, whereby the frame 37 will be held until manually released, thus interrupting the circuit containing the circuit breaker.

In Fig. 5 is shown the manner of arranging the instruments on low or high pressure circuits, the low tension line wire being indicated at 30 and which is supposed to lie above a high pressure circuit, the line wire of which is designated 50. These circuits are respectively energized from any suitable source of supply illustratively shown by the generators A′ and B′. Now if the line wire 30 breaks the magnet 13 will be deënergized and the circuit grounded as previously described. If, however, this broken wire contacts electrically with the wire 50, the grounding of that wire through the broken wire will at once increase the amperage passing through the circuit breaker embraced in the high tension circuit and this will operate the circuit breaker to open the high tension circuit and thus prevent damage to the low tension circuit.

The low tension instrument B is intended for use with a low tension generator indicated as a battery A′ in the line wire 30 and with low tension translating devices as indicated by the lamps D′, while the high tension instrument has its line wire 50 connected to a high tension generator B′ and high tension translating device as typified by the motor C′.

Having thus described the invention, what is claimed is—

1. In a device of the class described, a line cut-out and grounding instrument including an electro-magnet having a movably supported spring actuated core, an oscillatory spring actuated armature carrying frame, a contact post intermediate said frame and the electro-magnet, a contact brush carried by the frame and normally engaging the contact post, grounding posts consisting of inverted U-shaped frames having inclined contact faces supported adjacent to the side of the armature carrying frame distant from the electro-magnet, a contact brush carried by the frame and adapted to engage the grounding posts and means for adjusting the tension of the spring whereby the armature carrying frame is impelled in the direction of the grounding posts.

2. The combination of a high tension electric circuit and a low tension electric circuit crossing the first mentioned circuit, of a grounding switch in said low tension circuit operable upon interruption of the circuit, and an over-load circuit breaker in the high tension circuit operable upon the establishment of contact between said high tension circuit and the interrupted low tension circuit.

In testimony whereof I affix my signature in presence of two witnesses.

WILLIAM F. SWOVELAND.

Witnesses:
P. M. SWANGER,
W. C. FLETCHER.